US010807709B2

(12) United States Patent
Selfridge

(10) Patent No.: US 10,807,709 B2
(45) Date of Patent: Oct. 20, 2020

(54) AERIAL SYSTEM UTILIZING A TETHERED UNI-ROTOR NETWORK OF SATELLITE VEHICLES

(71) Applicant: Justin Selfridge, Newport News, VA (US)

(72) Inventor: Justin Selfridge, Newport News, VA (US)

( * ) Notice: Subject to any disclaimer, the term of this patent is extended or adjusted under 35 U.S.C. 154(b) by 460 days.

(21) Appl. No.: 15/430,475

(22) Filed: Feb. 11, 2017

(65) Prior Publication Data

US 2018/0229838 A1 Aug. 16, 2018

(51) Int. Cl.
  *B64C 39/02* (2006.01)
  *B64C 37/02* (2006.01)

(52) U.S. Cl.
  CPC ............ *B64C 39/022* (2013.01); *B64C 37/02* (2013.01)

(58) Field of Classification Search
  CPC ......... B64C 39/022; B64C 37/02; B64D 1/22; B64D 2201/128
  See application file for complete search history.

(56) References Cited

U.S. PATENT DOCUMENTS

| | | | | |
|---|---|---|---|---|
| 1,181,784 A * | 5/1916 | McCurry | ................. | B64C 27/82 244/17.19 |
| 2,373,086 A * | 4/1945 | Francois | ................. | B64D 1/02 258/1.4 |
| 4,416,436 A * | 11/1983 | Wilson, Jr. | ................ | B64D 1/22 244/137.1 |
| 5,074,489 A * | 12/1991 | Gamzon | ................. | B64C 37/02 244/2 |
| 5,395,070 A * | 3/1995 | Stirbl | ....................... | F24S 23/00 244/2 |
| 8,308,142 B1 * | 11/2012 | Olson | ..................... | B64C 37/02 244/137.1 |
| 2011/0084162 A1 * | 4/2011 | Goossen | ............... | B64C 39/024 244/12.1 |
| 2018/0002011 A1 * | 1/2018 | McCullough | ....... | B64C 29/0033 |

* cited by examiner

*Primary Examiner* — Richard G Davis

(74) *Attorney, Agent, or Firm* — Eric Hanscom

(57) ABSTRACT

A tethered uni-rotor network of satellite vehicles, is a novel aerial system which combines the best features of both fixed-wing and rotorcraft design methodologies, while minimizing their respective deficiencies. It is made up of a central hub with multiple tethers, where each tether arm radiates outward and attaches to a satellite vehicle; each having lifting airfoil surfaces, stabilizers, control surfaces, fuselages, and propulsion systems. The entire system operates in a state of rotation, which is driven by the propulsion units on each satellite. As the system rotates, centrifugal forces pull the satellite vehicles outward, which maintain tension on the tether arms. As the satellite vehicles move through space, the airfoils generate lift which supports each satellite and a distributed portion of the weight of the central hub.

20 Claims, 7 Drawing Sheets

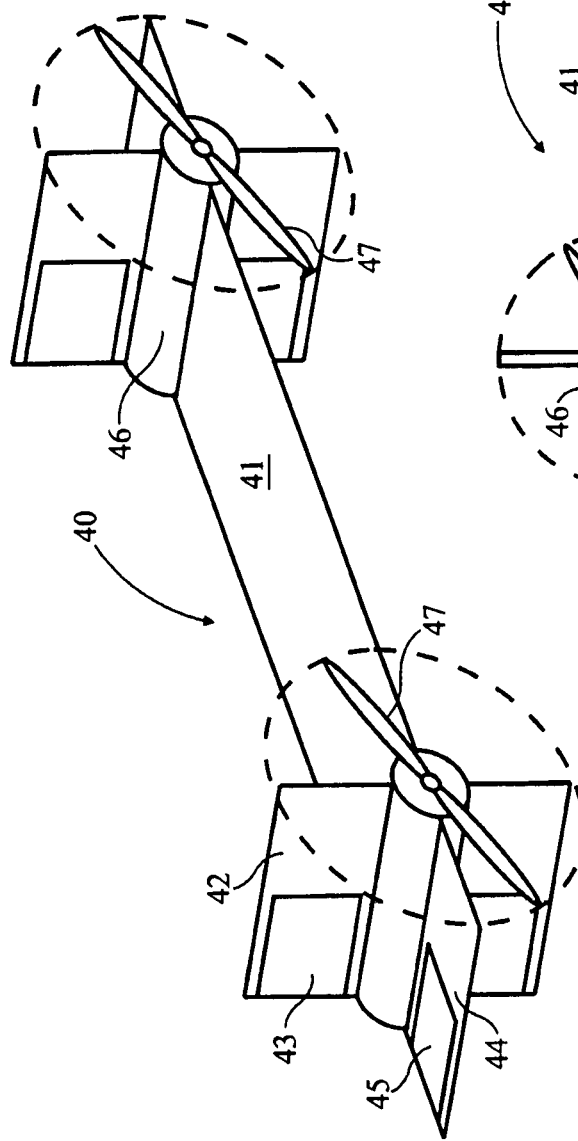
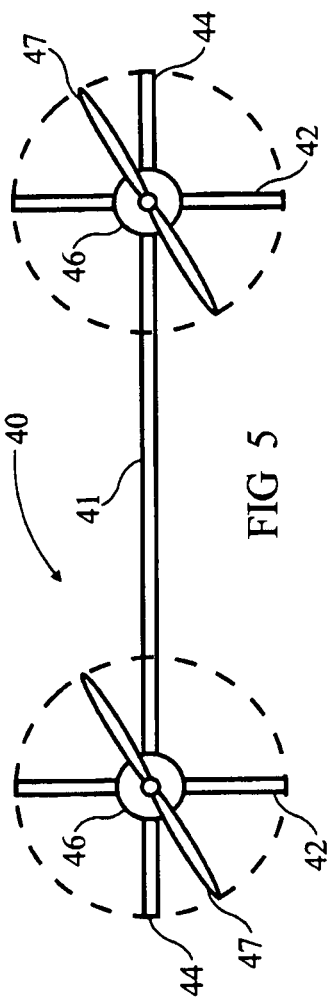
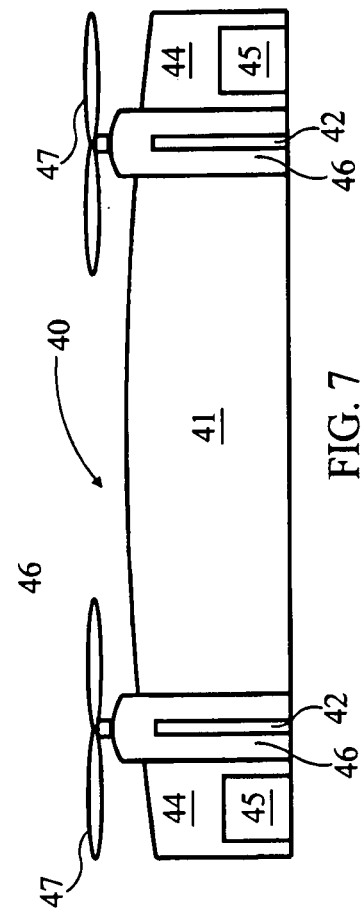
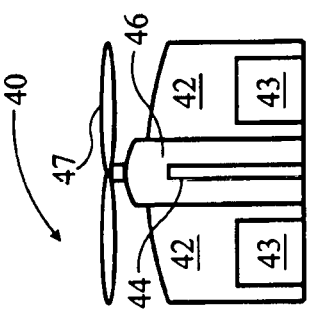
FIG. 4
FIG. 5
FIG. 7
FIG. 6

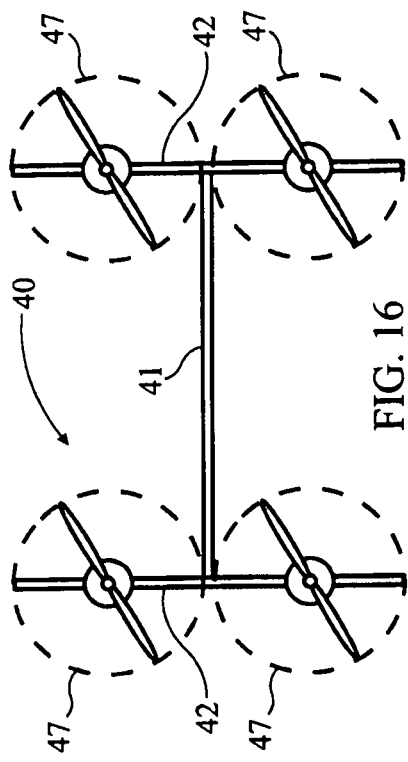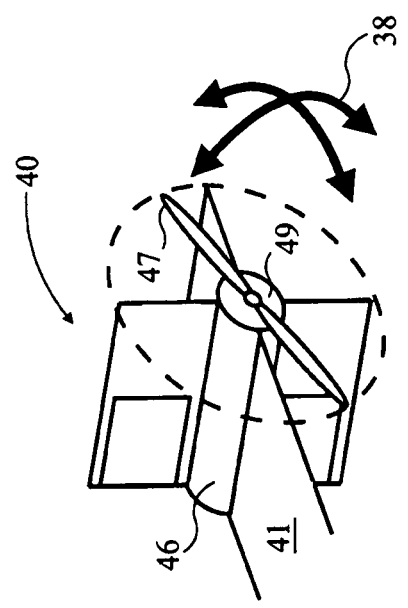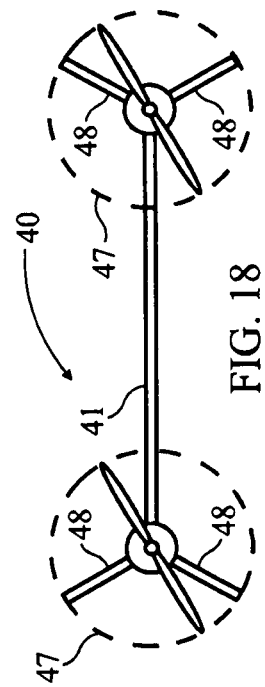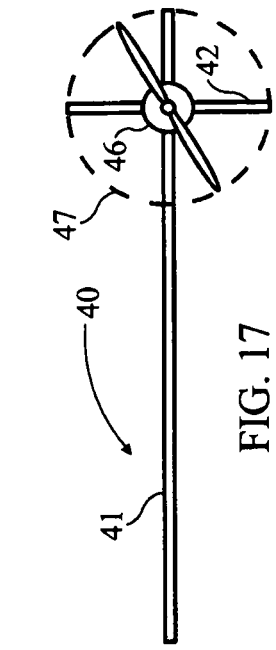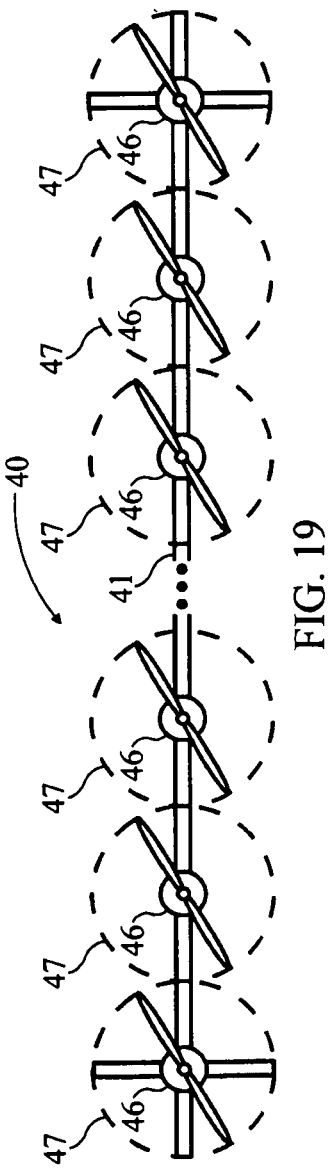

Prior Art

AERIAL SYSTEM UTILIZING A TETHERED UNI-ROTOR NETWORK OF SATELLITE VEHICLES

CROSS REFERENCE TO RELATED APPLICATIONS

None

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of aerial systems, and more specifically toward an aerial system utilizing a tethered uni-rotor network of satellite vehicles; which is, in particular embodiments, an aerial system with a novel design, which combines the best features of both helicopter and fixed-wing aircraft while minimizing each of their deficiencies.

Fixed-wing aircraft, particularly gliders, are very efficient vehicles which attempt to minimize the amount of drag acting on the system. One of the primary means available to engineers to achieve this is to increase the aspect ratio of the wing, which is the ratio between the wingspan and the chord length. A high aspect ratio wing is desirable from an aerodynamic drag perspective; however, there are limitations with this approach. As the wing becomes more slender, with a higher aspect ratio, it becomes much more flexible and can experience bend and twist during flight. Furthermore, longer wings are prone to greater bending moments at the root, which is the attachment point between the fuselage and wing. Counteracting this increased moment requires additional structural material to reinforce this connection point. Finally, fixed-wing aircraft need a forward velocity to facilitate airflow over the airfoil to produce lift. Thus, these systems cannot hover or takeoff vertically.

Unlike fixed-wing aircraft, helicopters have desirable vertical takeoff and landing (VTOL) and hovering capabilities. Consider a helicopter at rest on a tarmac. The rotor blades are generally so thin, that they bend and deflect under their own weight. However, these flimsy structures are capable of lifting a heavy vehicle once they are spinning, because they benefit from centrifugal forces which provide stiffening throughout the rotor element. The downside for such a rotor design, is it is not aerodynamically efficient. The rotors suffer from triangular span loading, meaning the outboard sections are primarily responsible for producing lift, while the inboard sections are quite ineffectual.

Thus, there has existed a long-felt need for an improved aerial system. One that is stable and controllable in flight, with desirable vertical takeoff and landing capabilities. One that reduces aerodynamic drag, by implementing a more efficient elliptical span loading across its lifting surfaces, but simultaneously mitigates bending moments common to slender wing profiles. One that carries a payload, and implements both hover and translational movement.

SUMMARY OF THE INVENTION

The current invention provides just such a solution with an aerial system utilizing a tethered uni-rotor network of satellite vehicles. The concept is made up of a central hub with multiple tethers, where each tether arm radiates outward and attaches to a satellite vehicle; each having lifting airfoil surfaces, stabilizers, control surfaces, fuselages, and propulsion systems. The entire system operates in a state of rotation, which is driven by the propulsion units on each satellite. As the system rotates, centrifugal forces pull the satellite vehicles outward, which maintain tension on the tether arms. As the satellite vehicles move through space, the airfoil generates lift which supports each satellite vehicle and a distributed portion of the weight of the central hub.

A goal of a tethered uni-rotor network system, according to selected embodiments disclosed herein, is to utilize centrifugal stiffening inherent within a traditional helicopter configuration, while keeping the beneficial VTOL/hover capabilities. Furthermore, the traditional helicopter rotor will be replaced with tethered satellite vehicles, which eliminate triangular span loading, which allows for a more ideal elliptical span loading distribution. Such an aerial system permits much higher aspect ratios than traditional fixed-wing glider designs, because the centrifugal stiffening mitigates the bending moment common in slender wing designs.

It is an object of the invention to provide an aerial system with improved aerodynamic efficiency by reducing aerodynamic drag.

It is additionally an object of the invention to provide an aerial system with increased structural rigidity through centrifugal stiffening.

It is another object of the invention to provide an aerial system with redundant lift systems.

It is also an object of the invention to provide an aerial system that operates at high altitude for an extended period of time.

It is a further object of this invention to provide an aerial system that may remain airborne for an indefinite period of time.

As used herein, a "satellite vehicle" shall describe the component that contains the fuselages, winged lifting surfaces, stabilizers, control surfaces, and propulsion units.

As used herein, a "tether" shall describe the flexible cable which connects a satellite vehicle to the central hub, and which maintains tension forces between the two.

As used herein, a "tether arm" shall describe a satellite vehicle connected to its respective tether.

As used herein, the "central hub" shall describe the centermost component to which all the tether arms are secured.

The most general embodiment of the current disclosure is an aerial system comprising a central hub, which connects to multiple tethers, which radiate outward away from the central hub, where at the end of each tether is a satellite vehicle. Each satellite vehicle comprises several components, including: fuselages, which house avionics components; winged airfoil sections, which produce lift; propulsion units, which provide thrust to counteract aerodynamic drag; stabilizer surfaces, which help the satellite vehicle maintain a desired trajectory; and control surfaces, which manipulate the trajectory of the satellite. The tether for each tether arm is a thin filament cable which transmits tension forces between the central hub and its respective satellite vehicle, but it does not transmit compression forces or bending moments.

The preferred embodiment for the number of tether arms is four. This allows for the easiest control methodology and permits redundancy in the event a tether arm becomes disabled. However, other numbers of tether arms are permissible. Two tether arms are the minimum number needed to counter balance the rotation, but this does not completely stabilize the central hub, which is free to swing like a hammock. As such two tether arms should be reserved for times when the other tether arms have become disabled, or for applications when the central hub is constrained in other ways, such as within an airborne wind energy device. Three tether arms is the minimum number needed to completely stabilize the central hub, and offers the most ideal aerodynamic properties from centrifugal stiffening, because it has the most concentrated mass in each tether arm. However, an odd number of tether arms is more difficult to control, because pairs of tether arms are not directly opposing one another, and it does not offer any redundancy in the event of a tether arm failure. Any number of tether arms greater than or equal to five is also conceivable, and can offer increased redundancy and robustness. However, with each additional arm the amount of beneficial centrifugal stiffening decreases and the complexity of the system increases, so using more tether arms represents a standard engineering tradeoff.

The preferred embodiment for the wing surface is a single, flat, horizontal, mono-wing, with an airfoil that produces lift at zero angle of attack. This is expected to be the simplest embodiment which provides the greatest benefit to the tethered uni-rotor network system. However, alternative configurations are acceptable. A non-lift producing profile may be beneficial for other applications. Angled or curved lifting surfaces may be introduced to attain different aerodynamic characteristics. Multiple lifting surfaces in various locations may provide enhanced stabilization or controllability for the entire system.

The preferred embodiment for the type of propulsion unit is a brushless electric motor with a fixed pitch propeller. This is the simplest embodiment which reduces mechanical complexity. However, other embodiments are allowable. Alternative fuel sources may be used to power the aircraft, such as heavy fuel, fuel cells, or hybrid systems. Variable pitch propellers could replace or compliment the fixed pitch propellers, which would offer a faster thrust dynamic response. Alternatively, propeller systems could be omitted, and other mechanisms used in its place, such as rocket or jet propulsion.

The preferred embodiment for the number of propulsion units is two. This permits each individual satellite vehicle to possess its own vertical takeoff and landing (VTOL) capability which greatly simplifies the takeoff and landing process for the entire tethered uni-rotor network system. A single propulsion unit is conceivable, but VTOL for each satellite vehicle is not possible, which complicates other aspects of the system operation during takeoff and landing. Propulsion units greater than two can also be employed, and may offer advantages despite the extra hardware complexity. For instance, four propulsion units arranged in a rectangle, resembles a standard quadrotor configuration, which may reduce complexity within the controller architecture. Or, placing a multitude of propulsion units on the leading edge of the airfoil has aerodynamic benefits, because forced air over the wing helps maintain laminar flow.

The preferred embodiment for the placement of propulsion units, stabilizers, and control surfaces is as follows. Two propulsion units are located near each of the wingtips of each satellite vehicle. Fuselages, located directly behind the propulsion units, house their respective components. Vertical stabilizers are mounted on the fuselages and located directly within the prop wash of the propellers, where each vertical stabilizer has a control surface, which mirrors a rudder functionality. The outermost sections of the wing can be considered horizontal stabilizers, each having their own control surfaces, which mirrors an elevon functionality, where an elevon combines the features of a traditional elevator and a traditional aileron. This preferred embodiment simplifies the controls development because the control inputs are orthogonal to one another, which yields strong input-output mappings. However, alternative embodiments exist which may be preferable under certain circumstances. The previously mentioned quadrotor propulsion configuration could do away with control surfaces entirely. Similarly, adding articulation to the orientation of the propulsion unit could eliminate the need for some control surfaces. Finally, angled stabilizers could offer a slight aerodynamic advantage by eliminating a small drag surface, but such a "ruddevator" has significant cross-coupling between inputs and outputs, and requires a more complicated control strategy.

The preferred embodiment for takeoff and landing operation includes a tether retracting mechanism, which can reel each of the tether arms in and out, to reduce the overall footprint of the tethered uni-rotor network system. This is the preferred embodiment because it increases the number of potential deployment locations and aids with storage when not in use. The retracting mechanism may be housed in either the central hub, or each of the wings of the satellite vehicle. Alternative embodiments may forgo a retracting mechanism, and elect to use standard landing gear mounted on each of the satellite vehicles.

A further embodiment of the current disclosure is a method of operating the tethered uni-rotor network system while in hovering flight. Where the aerial system is comprised of a central hub, where multiple tether arms radiate outward, where each tether arm is comprised of a tether element and a satellite vehicle, where each satellite vehicle is comprised of fuselages, wing sections, propulsion units, stabilizers, and control surfaces. Where the entire system operates in a state of rotation, with the propulsion units overcoming aerodynamic drag, with the airfoils providing lift to overcome gravity, with centrifugal forces keeping the tether arms taught, and with the tether elements transmitting tension forces but not compression forces or bending moments.

A further embodiment of the current disclosure is a method of dynamically controlling the tethered uni-rotor network system to achieve vertical and horizontal translation for the entire aircraft. Where the hover operation, described in the previous paragraph, is altered in the following ways. Where collectively adjusting throttle, changes the angular rate of the system, which changes the airflow over the wing, which changes the lift generated, which invokes vertical translation. Where collectively adjusting the elevons, changes the pitch of each satellite vehicle, which in-duces a spiral trajectory of the satellite vehicles, which also invokes vertical translation. Where cyclically adjusting the rudders, changes the tension in the tethers, such that at one point in the rotation there is a maximum pull from tension, and exactly opposite that point there is a minimum pull from tension, which creates a lateral force imbalance, which invokes horizontal translation. Where cyclically adjusting the elevons, changes the elevations of the satellite vehicle, such that at one point in the rotation each satellite vehicle passes a low point, and exactly opposite that point each satellite passes a high point, which alters the plane of rotation of the rotor, which tilts the overall thrust vector, which introduces a lateral force, which also invokes horizontal translation.

A further embodiment of the current disclosure is a method of utilizing a tether retracting mechanism to execute takeoff and landing for a tethered uni-rotor network system. Where each tether begins in a retracted state, such that each satellite is in close proximity to the central hub. Where each satellite vehicle is initially oriented upward in a tail-sitter configuration. Where each satellite vehicle has independent vertical takeoff and landing (VTOL) capabilities. Where all satellite vehicles takeoff in unison, thus supporting the weight of all the satellite vehicles and the central hub from thrust generated by the propulsion units. Where each satellite vehicle executes a maneuver moving away from the central hub, thus extending the tether arms until they are fully extended. Where each satellite pitches forward to begin the rotation of the tethered uni-rotor network system. Where each satellite continues to pitch forward through a transformational flight process, such that the weight of the system begins to shift from the propulsion units onto the wing lifting surfaces. Where the transformational process is completed once all satellite vehicles are in their forward flight configuration, and the wing lifting surfaces completely support the weight of the entire system, and the vehicle operates in a hover flight as previously described, and the system is dynamically controlled as previously described. Where the landing operation is identical to the takeoff procedure, but in an exactly opposite sequence. This is the preferred method of takeoff and landing because it minimizes the footprint of the aerial system.

An alternative embodiment of the current disclosure is a different method for takeoff and landing for a tethered uni-rotor network system, which forgoes the retracting mechanism previously described. Where there is no tether retracting mechanism. Where the satellite vehicles are equipped with a set of standard aircraft landing gear. Where the tethers are fully extended and the satellite vehicles are initially at rest away from the central hub. Where all the satellite vehicles increase throttle and begin to taxi while on the ground. Where the tether arms restrict the linear motion of the satellites vehicles in taxi and force them to circle around the central hub. Where all satellite vehicles continue to increase throttle until lift is sufficient to overcome the weight of the system, and the vehicle operates in a hover flight as previously described, and the system is dynamically controlled as previously described. Where the landing operation is identical to the takeoff procedure, but in an exactly opposite sequence. This is an acceptable alternative embodiment for takeoff and landing, when a retracting tether mechanism is not employed.

Thus, it has been outlined, rather broadly, the more important features of the invention, in order that the detailed description thereof may be better understood, and in order that the present contribution to the art may be better appreciated. While the previous description outlined the preferred embodiments, and summarized some notable alternative embodiments, these descriptions are for illustrative purposes only, and do not limit the scope of the disclosed invention. There are additional features of the invention that will be described hereinafter and which will form the subject matter of the claims appended hereto. The features listed herein and other features, aspects and advantages of the present invention will become better understood with reference to the following description and appended claims.

BRIEF DESCRIPTION OF THE FIGURES

The accompanying drawings, which are incorporated in and form a part of this specification, illustrate embodiments of the invention; and together with the description, serve to explain the principles of this invention.

FIGS. 4, 5, 6 and 7 include a perspective, front, side, and top view of a satellite vehicle according to selected embodiments of the current disclosure.

FIG. 15 is a perspective view of a satellite vehicle with a gimbal or articulated propulsion unit according to selected embodiments of the current disclosure.

FIG. 16 is a front view of a satellite vehicle with four propulsion units according to selected embodiments of the current disclosure.

FIG. 17 is a front view of a satellite vehicle with a single propulsion unit according to selected embodiments of the current disclosure.

FIG. 18 is a front view of a satellite vehicle with dual propulsion units and angled stabilizers according to selected embodiments of the current disclosure.

FIG. 19 is a front view of a satellite vehicle with a plurality of propulsion units according to selected embodiments of the current disclosure.

DETAILED DESCRIPTION OF THE INVENTION

Figure 1:
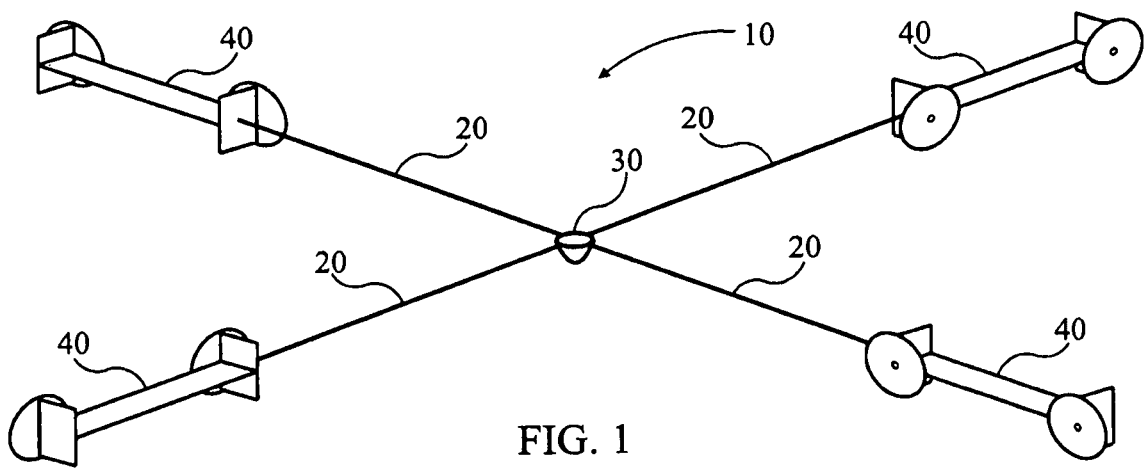
FIGS. 1 through 3 include a perspective, side, and top view of a tethered uni-rotor network aircraft according to selected embodiments of the current disclosure.

Many aspects of the invention can be better understood with the references made to the drawings below. The components in the drawings are not necessarily drawn to scale. Instead, emphasis is placed upon clearly illustrating the components of the present invention. Moreover, like reference numerals designate corresponding parts through the several views in the drawings.

According to selected embodiments, the tethered uni-rotor network of satellite vehicles is an aerial system that has a central hub, with multiple tethers that radiate outwards, which each attach to a satellite vehicle at the outboard position. Each satellite vehicle resembles a small aircraft system which include: fuselages containing avionic components, airfoil lifting sections, propulsion units, stabilizers, and control surfaces. Embodiments of the aerial system herein, operates in a perpetual state of rotation during flight.

The rotation is driven by the propulsion units on each of the satellite vehicle. As the system spins, centrifugal forces keep the tethers taught. Furthermore, as the system spins, each satellite vehicle moves through the air, which generates lift on the winged airfoil sections. The amount of lift generated is enough to counteract the weight of the satellite vehicles and a distributed portion of the weight of the central hub.

Figure 2:
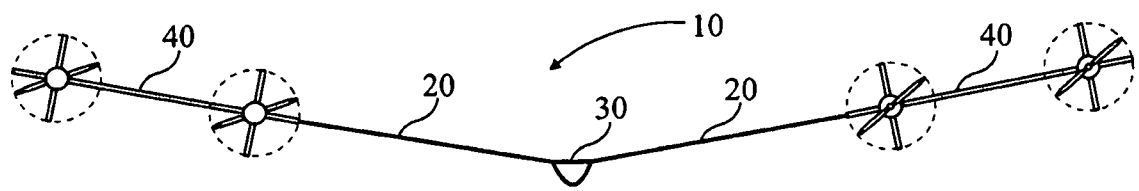
Figure 3:
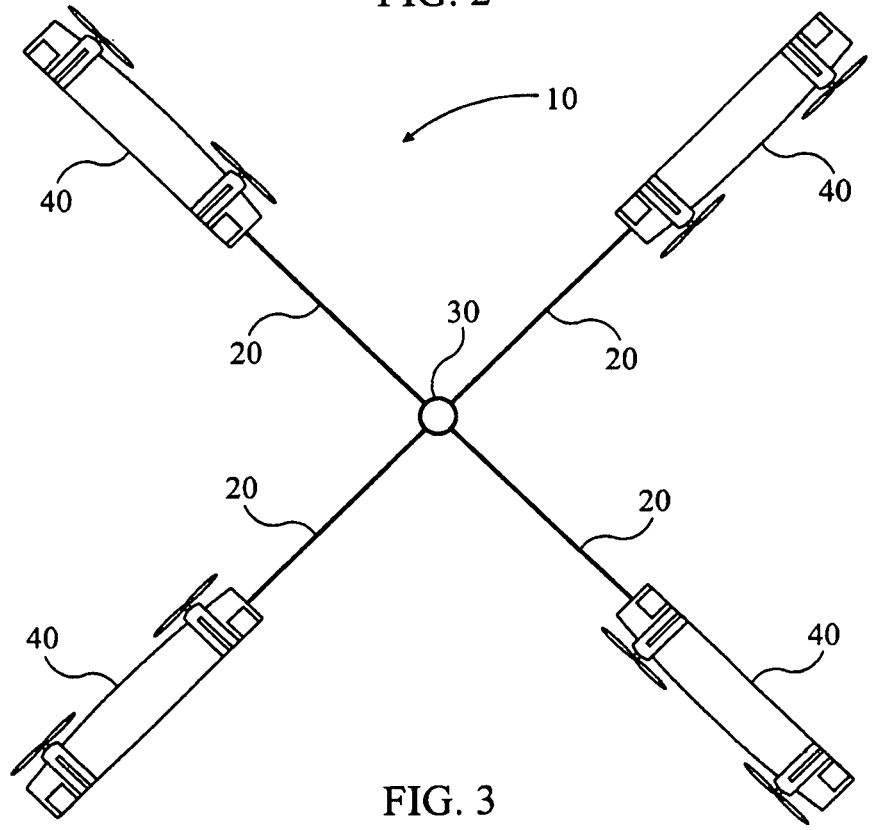

FIG. 1 is a perspective view, FIG. 2 is a side view, and FIG. 3 is a top view, of a tethered uni-rotor network aircraft according to selected embodiments of the current disclosure. The tethered uni-rotor network aircraft 10 includes multiple satellite vehicles 40, in this view four satellite vehicles 40, which are each connected to the central hub 30 via their own tether 20. The satellite vehicles 40 rotate around the central hub 30.

FIG. 4 is a perspective view, FIG. 5 is a front view, FIG. 6 is a side view, and FIG. 7 is a top view, of a satellite vehicle according to selected embodiments of the current disclosure. The satellite vehicle 40 has fuselages 46, in this embodiment there are two, which each have a propulsion unit 47, in this embodiment it is a propeller, to generate thrust. A lifting surface 41, such as a wing, provides lift, which is a generally upward force. Horizontal stabilizers 44 and vertical stabilizers 42 provide overall stability to the satellite vehicle 40. Several control surfaces provide directional control for both yaw and pitch, to the satellite vehicle 40. Vertical control surfaces 43 act as rudders, and horizontal control surfaces 45 act as elevons. As shown in this figure, the satellite vehicle has a symmetrical "flying wing" design, with two props on either end, and all the control surfaces located within the prop wash. As will be appreciated by those skilled in the art, other positions, locations, orientations, or geometries of the lifting surfaces, stabilizers, control surfaces, or propulsion units, may be used to control the satellite vehicles.

The tethered uni-rotor network systems, disclosed herein, utilize the same beneficial centrifugal stiffening as a traditional helicopter rotor. However, the inboard rotor sections, which represent wasted material and have detrimental aerodynamic properties, are replaced with a thin tether filament. Because the outboard section is free to pivot about the tether connection point, there is no detrimental bending moment which is typically found at the wing root of fixed-wing glider designs. As such, the centrifugal stiffening within the aerial aircraft allows for much greater aspect ratios than can be attained by a traditional tube-and-wing style aircraft.

Figure 8:
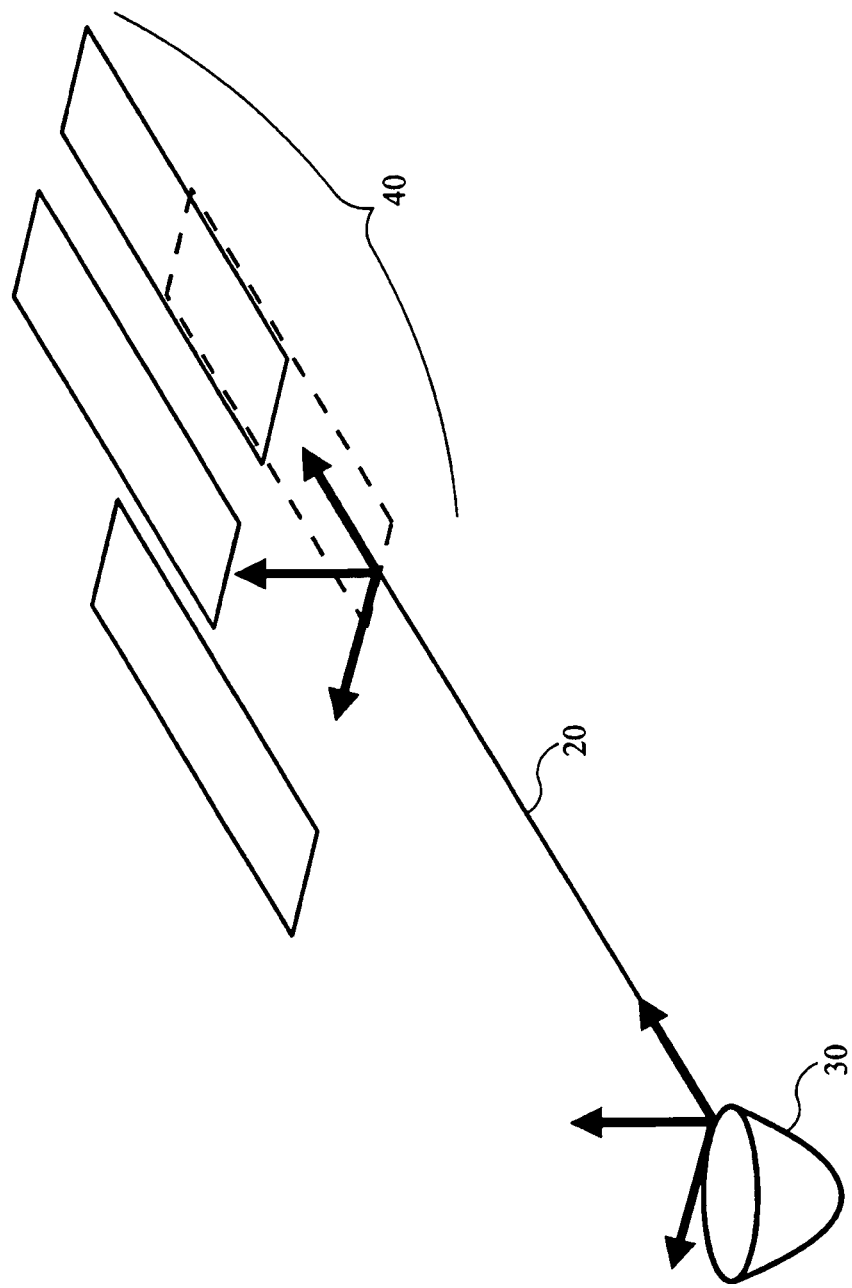
FIG. 8 is a diagram showing the interacting forces transmitted by the tether between the satellite vehicle and the central hub according to selected embodiments of the current disclosure.

FIG. 8 is a diagram showing the interacting forces transmitted through the tether between the satellite vehicle and the central hub according to selected embodiments of the current disclosure. As the system operates, three components of a force vector act at the connection point on the central hub. A vertical force arises from the weight of the central hub, a lateral force arises from the aerodynamic drag pulling on the tether, and a radial force arises from the centrifugal forces present from the rotation of the system. These three forces are present even during the hover operation of the tethered uni-rotor network system. However, altering the relative position of a satellite vehicle with respect to the central hub, will also alter the magnitude of the component forces acting on the central hub anchor point. As the satellite vehicle 40 moves away from the central hub 30, the satellite vehicle 40 pulls on the tether 20, which in turn increases the magnitude of the radial force on the central hub 30. Similarly, moving inward decreases the magnitude of the vector. As the satellite vehicle 40 moves upward with respect to the central hub 30, the satellite vehicle 40 pulls upward on the tether 20, which in turn increases the magnitude of the vertical force on the central hub 30. Similarly, moving downward decreases the magnitude of the vector. As the satellite vehicle 40 moves forward with respect to the central hub 30, the satellite vehicle 40 pulls forward on the tether 20, which in turn increases the magnitude of the lateral force on the central hub 30. Similarly, moving backward decreases the magnitude of the vector. So long as there is tension in the tether, these forces are transferred to the hub, subject to drag and other frictional losses.

Relative positions of the satellite vehicles with respect to the central hub dictate the magnitudes of the forces acting on the central hub. By using appropriate coordinated flight maneuvers among each of the satellite vehicles, the total forces acting on the central hub can be manipulated such that the entire tethered uni-rotor network system achieves translation. Two types of translation are considered, vertical and horizontal, which have a parallel in helicopter terminology as "collective" and "cyclic" commands. Each type of translation has two associated control modes, each of which are described in greater detail in the following two paragraphs.

Vertical translation uses "collective" commands, where each satellite vehicle adjusts its settings in unison. Adjusting the throttle increases or decreases the velocity of the satellite vehicle, and thus the angular rate of rotation of the aerial system. This changes the amount of airflow over the lifting surfaces or wing, which increases or decreases the total amount of lift generated. Adjusting the amount of lift causes the aerial system to ascend or descend. Second, adjusting the pitch of each satellite vehicle through the elevon control surfaces, will cause each satellite vehicle to nose up or down, thus the entire system will climb or fall as each satellite vehicle moves through a spiral trajectory.

Horizontal translation is achieved with "cyclic" commands, where the control inputs are changed in a sinusoidal fashion throughout the rotation. The first cyclic command is applied to the rudder control surface, which manipulates the amount of radial tension on the tether. At one point there is a maximum pull from the tension, and exactly opposite that point there is a minimum pull from tension. This imbalance causes the aerial system to translate horizontally. Second, cyclic elevon commands can achieve horizontal translation. At one point a satellite vehicle passes a low elevation, and at the exact opposite point the satellite vehicle passes a high elevation. This essentially reorients the plane of rotation of the rotor, which tilts the vertical thrust vector from the airfoils, such that now a horizontal component is present. This type of thrust vectoring is similar to how traditional multirotors translate horizontally.

Having described the hover operation and the overall control methodology, now consider the preferred embodiment for the takeoff and landing procedure. The next four paragraphs describe an approach which utilizes a retracting tether mechanism to reel in and out the tether arms, which achieves a smaller footprint for the tethered uni-rotor network system during takeoff and landing.

Figure 9:
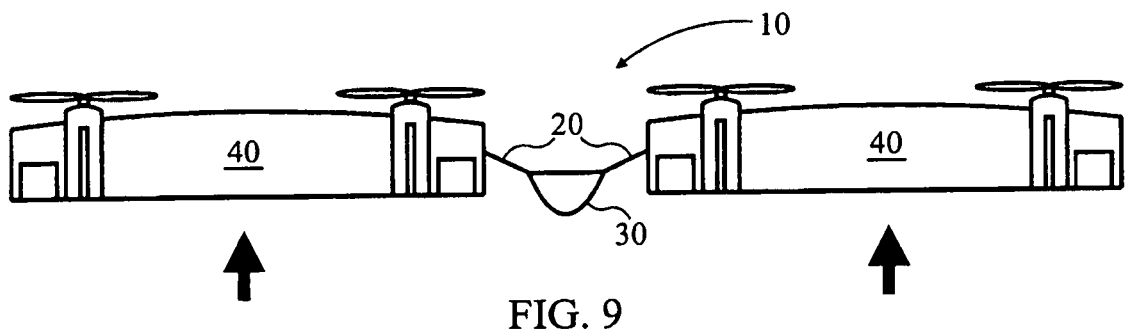
FIG. 9 is a side view of a tethered uni-rotor network aircraft in a vertical takeoff configuration according to selected embodiments of the current disclosure.

FIG. 9 is a side view of a tethered uni-rotor network aircraft in a vertical takeoff configuration according to selected embodiments of the current disclosure. Each satellite vehicle 40 is oriented upward in a tail-sitter configuration. Each of the propulsion units generate a downward thrust, thereby producing an upward force which lifts each satellite vehicle. The figure depicts each satellite vehicle as connected to the central hub 30 via a reeled in tether 20. Other embodiments of the design may include a locking mechanism which secures each of the satellite vehicles to the central hub prior to takeoff.

Figure 10:
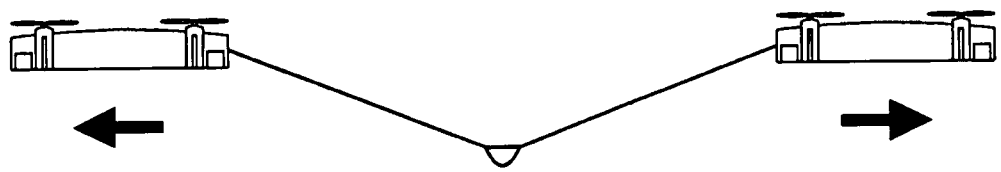
FIG. 10 is a side view of a tethered uni-rotor network aircraft as the satellite vehicles extend the tether arms outward according to selected embodiments of the current disclosure.

FIG. 10 is a side view of a tethered uni-rotor network aircraft as the satellite vehicles extend the tether arms outward according to selected embodiments of the current disclosure. As long as the satellite vehicle design has appropriately placed propulsion units and control surfaces, each satellite vehicle will have its own independent VTOL capability. Once the satellite vehicles attain a suitable altitude, they begin to traverse away from the central hub, thereby extending each of the tether arms. Because the tethered uni-rotor network vehicle has not initiated its rotation, there is no centrifugal force to overcome while the tether arms are being let out.

Figure 11:
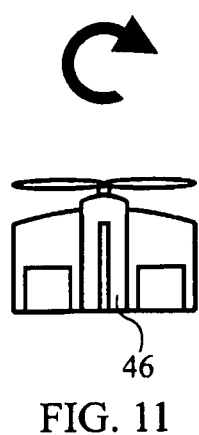
FIGS. 11, 12 and 13 are diagrams showing the satellite vehicle transition from vertical takeoff and landing to forward flight according to selected embodiments of the current disclosure.
Figure 12:
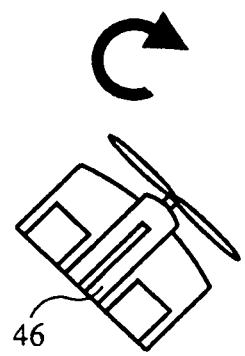
Figure 13:
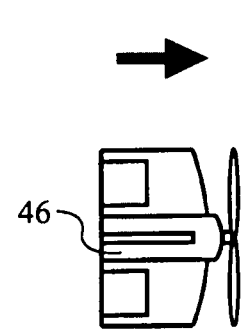

FIGS. 11, 12, and 13 are diagrams showing the satellite vehicle transition from vertical takeoff to forward flight according to selected embodiments of the current disclosure. FIG. 11 shows the satellite vehicle in a vertically oriented hover position, where the propulsion units are supporting the total aerial system weight. FIG. 12 shows the satellite vehicle pitching forward, thereby transitioning into its forward flight configuration. The propulsion unit is oriented partially upward such that it provides thrust in both an upward and forward direction, which provides both lift and horizontal translational movement of the satellite vehicle. During this transition process, an increasing portion of the system weight is supported by the winged lifting surfaces. FIG. 13 shows the satellite vehicle after it has completed the transition process, where it is now operating in its standard forward flight mode. The propulsion unit is oriented horizontally resulting in horizontal translational movement of the satellite vehicle, while the winged lifting surface bears the total weight of the aerial system.

Figure 14:
FIG. 14 is a side view of a tethered uni-rotor network aircraft with its tethers fully extended according to selected embodiments of the current disclosure.

FIG. 14 depicts the tethered uni-rotor network system once the satellite vehicles have completed the transition process. The aerial system is now operating with fully extended tethers, rotating at its intended angular rate, and operations for the aerial system are identical to that of the hover flight previously described. The takeoff procedure was explicitly described in previous paragraphs, and the landing procedure follows an identical process, but carried out in the reverse order.

Embodiments of the current disclosure provide for an aerial system with multiple tether arms. One arm is not a valid configuration because there is no means of counter balancing the rotation. Two arms are able to counter balance one another, but the central hub is free to swing like a hammock. Thus this configuration should only be used as a means of recovering a vehicle, should the other tether arms become disabled, or as part of a system that constrains the central hub in other ways, like the primary tether on an airborne wind energy device. Three arms are the minimum number needed to achieve stability within the central hub, and a preferable number in terms of aerodynamic efficiency, because it has the most concentrated weight to provide the most centrifugal force per satellite. The disadvantage is that, for an odd number of tether arms, horizontal translation is more difficult to control, because pairs of tether arms are not directly opposite one another. Four arms have less ideal centrifugal stiffening than three arms, but it is easier to implement horizontal translation because pairs of tethers are directly opposed to one another. Five or more arms are all physically possible, and could be used to add redundancy and robustness to the system as a safety measure, but adding more arms increases complexity and compromises the amount of centrifugal stiffening.

Each satellite vehicle needs a propulsion unit, which counteracts aerodynamic drag acting on the body, while keeping the tethered uni-rotor network aircraft in a state of rotation. The preferred embodiment uses fixed pitch propellers with brushless electric motor systems, because of its simplicity. Other means of propulsion units are also acceptable. Variable pitch propellers could replace or compliment fixed pitch propellers. Various fuel sources; like heavy fuel, fuel cells, or hybrid systems; could replace or compliment an electric power supply. Or a propeller methodology could be completely omitted, and jet or rocket systems could be elected to provide thrust for each satellite vehicle.

FIG. 15 is a perspective view of a satellite vehicle with a gimbal or articulated propulsion unit according to selected embodiments of the current disclosure. The fuselage 46 includes a gimbal or joint 49 that supports the propulsion unit 47, in this embodiment it is a propeller. The propulsion unit 47 moves in various directions and in one or more axes 38 relative to the satellite vehicle 40 via the gimbal or joint 49. The various directions of the propulsion unit provides various directions of thrust which act on the satellite vehicle 40. Additional degrees of freedom within the propulsion unit mechanism may be used to reduce the number of stabilizers, control surfaces, or both.

FIG. 16 is a front view of a satellite vehicle with four propulsion units according to selected embodiments of the current disclosure. Each propulsion unit 47 of the satellite vehicle 40 is above or below the lifting surface 41, and secured to a vertical stabilizer 42. The benefit of this arrangement, is that it resembles a quadrotor type of configuration, which may simplify the controller architecture, and can do away with control surfaces entirely; albeit with a more complicated structural design.

FIG. 17 is a front view of a satellite vehicle with a single propulsion unit according to selected embodiments of the current disclosure. A single propulsion unit on each satellite system is the minimum number needed to overcome aerodynamic drag. As shown in this figure, the propulsion unit 47 is mounted on a fuselage 46, which is positioned on the satellite vehicle 40. The location that provides the most centrifugal benefit is located on the outboard wingtip, but inboard or middle placements are conceivable as well. While a single propulsion unit is sufficient to power the satellite vehicle, this leads to complications when implementing the landing system. A single propulsion unit does not provide VTOL capabilities for each individual satellite, so the transition process previously described for takeoff and landing is not possible. Rather, the tether retracting mechanism must operate while the aerial system is still rotating, and thus overcome the full magnitude of the centrifugal forces pulling on the satellite vehicle, while reeling in the tether arm.

FIG. 18 is a front view of a satellite vehicle with a dual propulsion units and angled stabilizers according to selected embodiments of the current disclosure. This embodiment uses two propulsion units 47 per satellite 40, one on each end of the wing section 41. By adding a second propulsion unit with appropriately placed control surfaces, each satellite can takeoff from a tail-sitter configuration, and then transition a quarter turn into its horizontal or forward flight configuration. Because each satellite vehicle has its own VTOL capability, the system may stop its rotation such that the retracting mechanism does not need to overcome the centrifugal forces. Also, shown in this figure are angled stabilizers and control surfaces 48, which operate in a similar fashion to a "ruddevator" of a V-tail aircraft. This may slightly reduce aerodynamic drag, by eliminating a small stabilizer surface, but it also increases the complexity of the controller, because it introduces coupling within the input-output channels.

FIG. 19 is a front view of a satellite vehicle with a plurality of propulsion units according to selected embodiments of the current disclosure. Many propulsion units 47 mounted onto their respective fuselages 46 are distributed across the leading edge of the winged lifting surface 41 of the satellite vehicle 40. This configuration applies forced air over the airfoil which may lead to better laminar flow over the wing surface. However, these additional propulsion units represent an engineering tradeoff that must be evaluated against any extra weight and manufacturing complexity.

Figure 20:
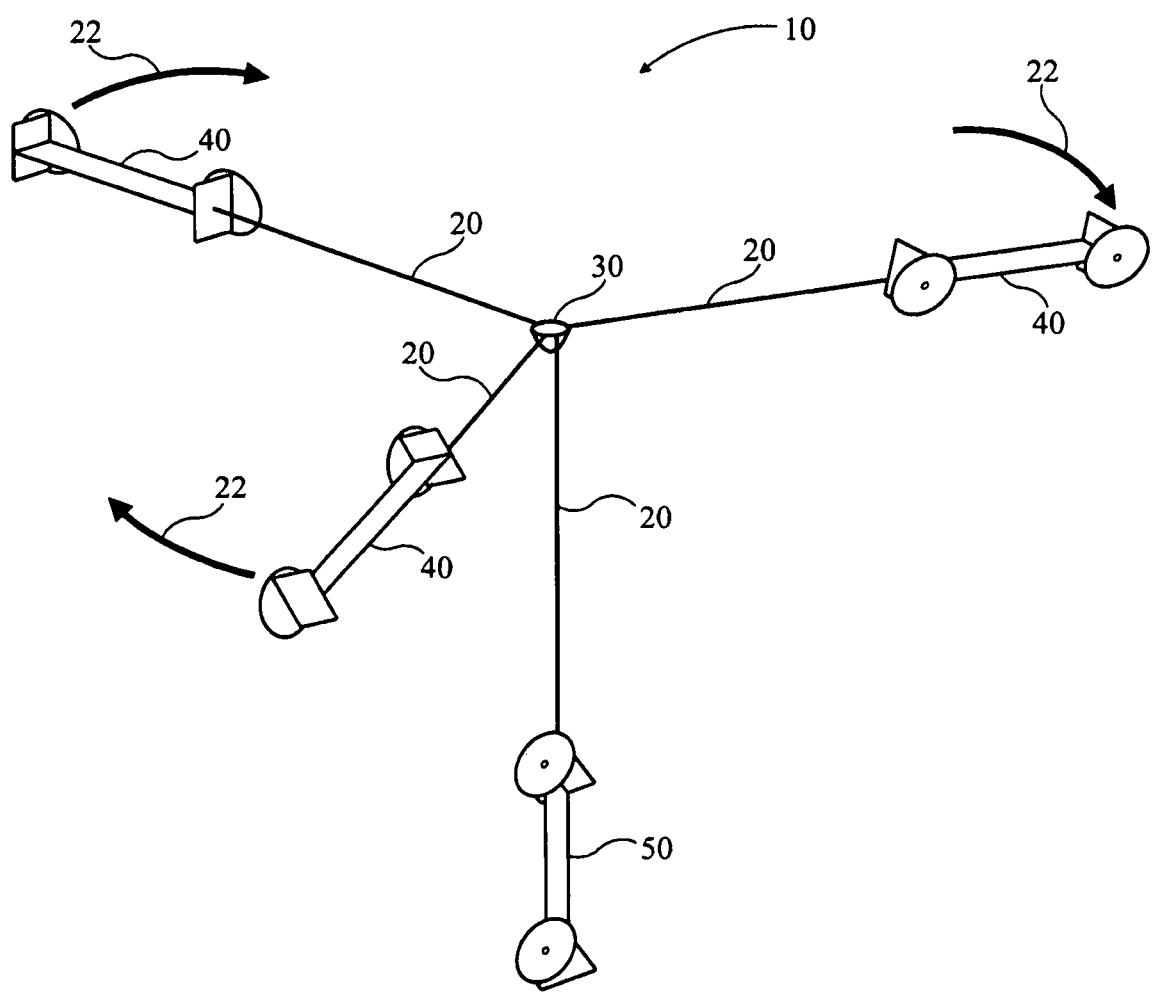
FIG. 20 is a perspective view of a tethered uni-rotor network aircraft with a satellite vehicle failure according to selected embodiments of the current disclosure.

FIG. 20 is a perspective view of a tethered uni-rotor network aircraft with a satellite vehicle failure according to selected embodiments of the current disclosure. This illustration shows a tethered uni-rotor network system with a total of four satellite vehicles. Three are functional satellite vehicles 40 which are still rotating 22 around the central hub 30. The fourth one is a failed satellite vehicle 50, which is still attached to the central hub 30 via its tether 20. The three remaining functional satellite vehicles 40 must support the weight of the central hub 30 as well as weight of the failed satellite 50. The distance between each functional satellite vehicle 40 is adjusted such that they maintain an equal distance from one another. For example, the original four functional satellite vehicles would maintain a one-quarter circumference spacing. Upon failure of one of the satellite vehicles 50, the three remaining functional satellite vehicles 40, will readjust to maintain a one-third circumference spacing.

Embodiments of the current disclosure provide the potential to improve upon wind energy collection stations. As a starting point, consider the design of the most common energy kites used for airborne wind energy harvesting.

Figure 21:
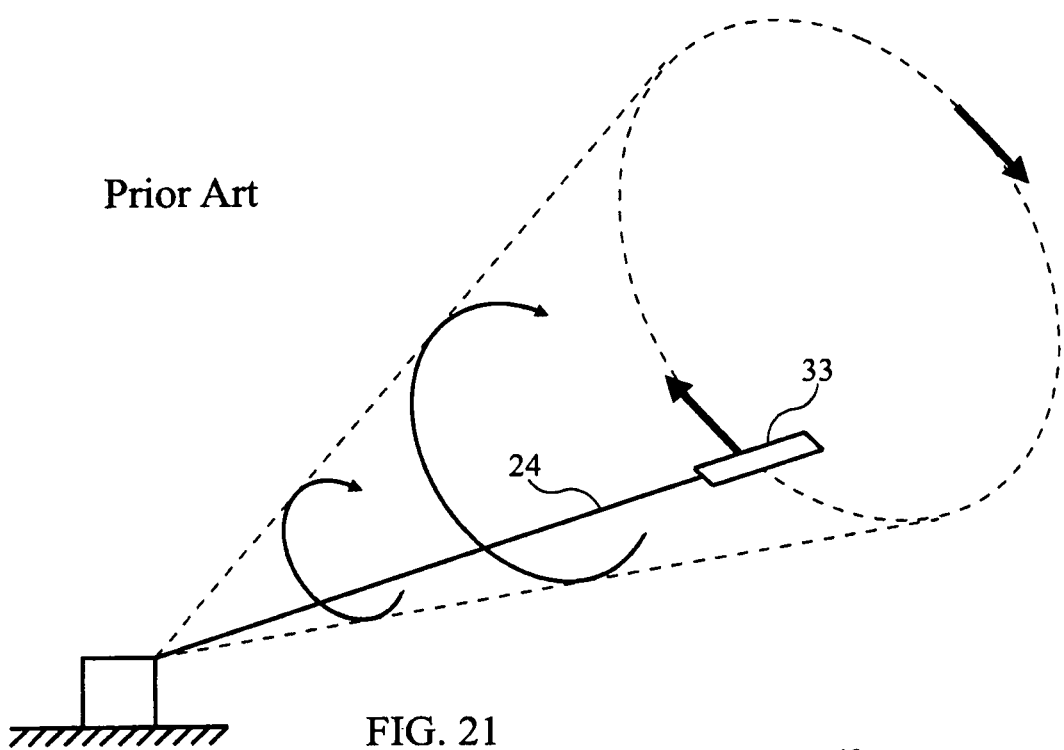
FIG. 21 is a view of a prior art airborne wind energy device.

FIG. 21 is a diagram of a prior art airborne wind energy device. Basically, its a long slender flying wing 33 which is anchored with an adjustable tether 24. When it is ready to harvest wind energy, it flies up in the air in a large circle, so that the tether 24 sweeps a huge cone shape. The tether is connected to a generator that produces electricity as the tether is pulled out by the wind. Once the tether is at a maximum length, the energy kite comes out of the wind, and the tether 24 reels itself back in. The idea is that there is a net energy gain; meaning, the system collects more energy while airborne, than is needed to reel the system back in at the lower energy state.

A major problem with the current technology, is the amount of drag acting on the tether 24. Because the tether is several kilometers long, it sweeps out a huge cone, all influenced by detrimental parasitic drag. Furthermore, the method of securing most energy kites introduces the same types of bending moments common within gliders found at the wing root. Finally, during periods of calm winds, many existing designs utilize a multirotor approach to stay aloft, which is not energy efficient, and thus reduces the total amount of collected energy. Now consider an aerial system according to the current disclosure, where the wind energy generator is tethered to the central hub, such that the central hub serves as a stationary pivot point that the system may rotate around. Each of the small individual satellite vehicle tethers will still feel drag, but the primary major tether, the one that stretches for several kilometers, can remain stationary without losing energy to aerodynamic drag.

Figure 22:
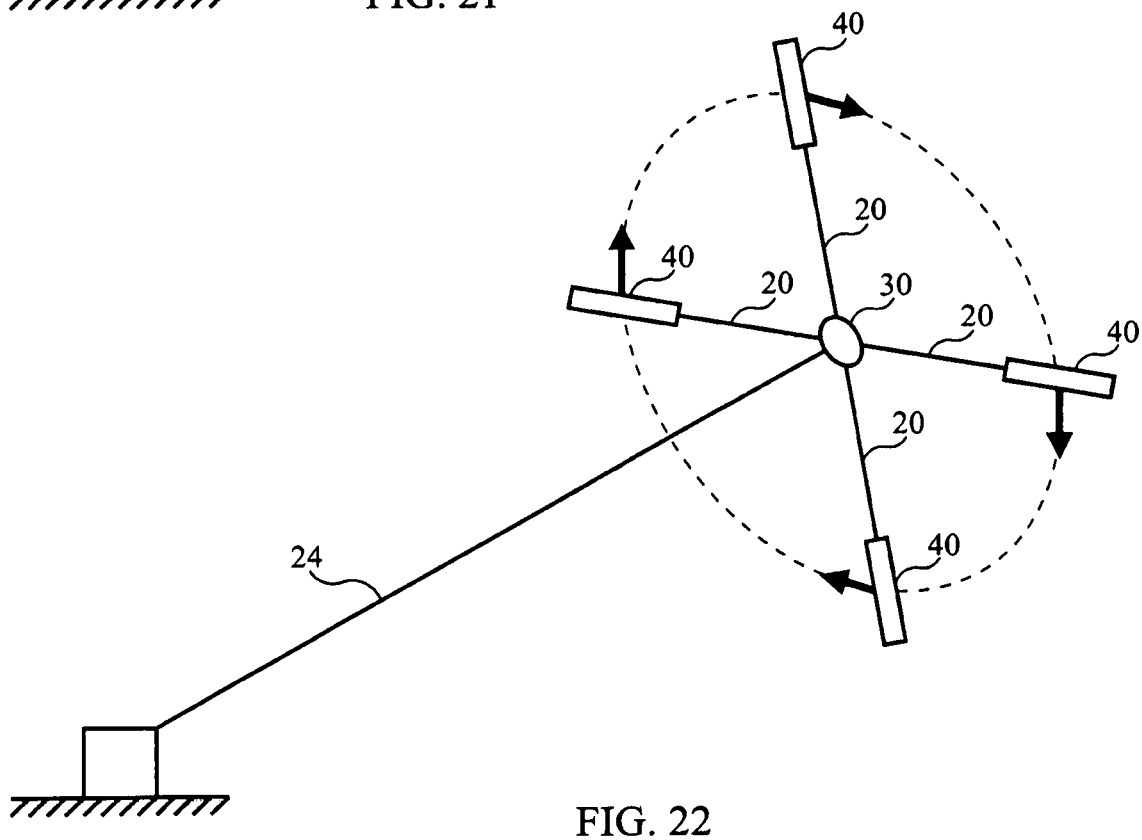
FIG. 22 is a view of a tethered uni-rotor network system adapted to an airborne wind energy device according to selected embodiments of the current disclosure.

FIG. 22 is a view of a tethered uni-rotor network system adapted to an airborne wind energy device according to selected embodiments of the current disclosure. The four tethers are much shorter in length than the primary tether, they have a reduced diameter because they are only sized for each satellite vehicle, and inboard sections have little velocity and thus feel very light drag effects. The satellite vehicles 40 rotate about the central hub 30 via tethers 20. Such a system is contrasted with a massive tether 24, designed to support the entire kite system 33, using a much larger diameter cable, with a much longer length of several kilometers, and where portions of it are traveling at the same rate as the energy kite system. Once again, bending moments on the energy kite can be mitigated through centrifugal stiffening, and the inefficient multirotor design to sustain flight during clam periods is replaced with a much more aerodynamically efficient aerial system.

It should be understood that while the preferred embodiments of the invention are described in some detail herein, the present disclosure is made by way of example only. Variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

That which is claimed is:

1. An aerial vehicle comprising;
   a central hub, two or more satellite vehicles, and two or more tethers which secure each satellite vehicle to the central hub, which radiate outward in a hub-and-spoke arrangement;
   where the aerial vehicle always operates in a state of rotation;
   where the central hub is a permanent member of the aerial vehicle;
   where the central hub rotates with the aerial vehicle;
   where each satellite vehicle comprises one or more wings to generate lift;
   where one or more of the wings comprises one or more structural members to maintain the rigidity of the wing;
   where each tether attaches to an inboard portion of the wing on each satellite vehicle;
   where each satellite vehicle utilizes an asymmetrical layout;
   such that, the rotation of the aerial vehicle subjects each satellite vehicle to a centrifugal force;
   such that, the location of each tether connected to the inboard portion of the wing on each satellite vehicle places the one or more wings under tension;
   such that, a bending moment is reduced or eliminated within each structural member;
   such that, reducing the bending moment within the structural members, permits higher aspect ratio wings than those that do not utilize centrifugal stiffening.

2. The aerial vehicle of claim 1, wherein each satellite vehicle further comprises one or more propulsion units, where each of the one or more propulsion units has a thrust vector.

3. The aerial vehicle of claim 2, wherein one or more of the propulsion units can orient its thrust vector relative to the satellite vehicle as a means of controlling each satellite vehicle.

4. The aerial vehicle of claim 2, wherein two or more of the propulsion units utilize differential thrust as a means of controlling each satellite vehicle.

5. The aerial vehicle of claim 1, wherein each satellite vehicle further comprises one or more horizontal stabilizers.

6. The aerial vehicle of claim 1, wherein each satellite vehicle further comprises one or more vertical stabilizers.

7. The aerial vehicle of claim 1, wherein each satellite vehicle further comprises one or more angled stabilizers.

8. The aerial vehicle of claim 1, wherein each satellite vehicle further comprises one or more horizontal control surfaces.

9. The aerial vehicle of claim 1, wherein each satellite vehicle further comprises one or more vertical control surfaces.

10. The aerial vehicle of claim 1, wherein each satellite vehicle further comprises one or more angled control surfaces.

11. An aerial vehicle comprising;
a central hub, two or more satellite vehicles, and tethers which secure each satellite vehicle to the central hub, which radiate outward in a hub-and-spoke arrangement;
where the aerial vehicle always operates in a state of rotation;
where the central hub is a permanent member of the aerial vehicle;
where the central hub rotates with the aerial vehicle;
where each satellite vehicle comprises one or more wings to generate lift;
where each satellite vehicle comprises one or more propulsion units to generate thrust;
where each satellite vehicle comprises one or more stabilizers or control surfaces;
where one or more of the wings comprises one or more structural members to maintain the rigidity of the wing;
where each tether attaches to an inboard portion of the wing on each satellite vehicle;
where each satellite vehicle utilizes an asymmetrical layout;
such that, the rotation of the aerial vehicle subjects each satellite vehicle to a centrifugal force;
such that, the location of each tether connected to the inboard portion of the wing on each satellite vehicle places the one or more wings under tension;
such that, a bending moment is reduced or eliminated within each structural member;
such that, reducing or eliminating the bending moment within the structural members, permits higher aspect ratio wings than those that do not utilize centrifugal stiffening.

12. The aerial vehicle of claim 11, wherein one or more of the propulsion units can orient its thrust vector relative to the satellite vehicle as a means of controlling each satellite vehicle.

13. The aerial vehicle of claim 11, wherein two or more of the propulsion units utilize differential thrust as a means of controlling each satellite vehicle.

14. The aerial vehicle of claim 11, wherein the number of satellite vehicles is three.

15. The aerial vehicle of claim 11, wherein the number of satellite vehicles is four.

16. The aerial vehicle of claim 11, wherein each satellite vehicle utilizes an asymmetrical layout with a single propulsion unit located at the outboard wingtip of its wing.

17. The aerial vehicle of claim 11, wherein each satellite vehicle utilizes an asymmetrical layout with a single horizontal stabilizer and control surface located at the outboard wingtip of its wing.

18. The aerial vehicle of claim 11, wherein each satellite vehicle utilizes an asymmetrical layout with a single vertical stabilizer and control surface located at the outboard wingtip of its wing.

19. The aerial vehicle of claim 11, wherein each satellite vehicle utilizes an asymmetrical layout with a single propulsion unit, a single horizontal stabilizer with control surface, and a single vertical stabilizer with control surface, all located at the outboard wingtip of its wing.

20. An aerial vehicle comprising;
a central hub, two or more satellite vehicles, and tethers which secure each satellite vehicle to the central hub, which radiate outward in a hub-and-spoke arrangement;
where the aerial vehicle always operates in a state of rotation;
where the central hub is a permanent member of the aerial vehicle;
where the central hub rotates with the aerial vehicle;
where each satellite vehicle comprises one or more wings to generate lift;
where one or more of the wings comprises one or more structural members to maintain the rigidity of the wing;
where each tether attaches to an inboard portion of the wing on each satellite vehicle;
where each satellite vehicle utilizes an asymmetrical layout;
such that, the rotation of the aerial vehicle subjects each satellite vehicle to a centrifugal force;
such that, the location of each tether connected to the inboard portion of the wing on each satellite vehicle places the one or more wings under tension;
such that, a bending moment is reduced or eliminated within each structural member;
such that, reducing or eliminating the bending moment within the structural members, permits higher aspect ratio wings than those that do not utilize centrifugal stiffening;
wherein each satellite vehicle further comprises one or more propulsion units;
wherein one or more of the propulsion units can orient its thrust vector relative to the satellite vehicle as a means of controlling each satellite vehicle;
wherein two or more of the propulsion units utilize differential thrust as a means of controlling each satellite vehicle;
wherein each satellite vehicle further comprises one or more horizontal stabilizers;
wherein each satellite vehicle further comprises one or more vertical stabilizers;
wherein each satellite vehicle further comprises one or more angled stabilizers;
wherein each satellite vehicle further comprises one or more horizontal control surfaces;
wherein each satellite vehicle further comprises one or more vertical control surfaces;
wherein each satellite vehicle further comprises one or more angled control surfaces.

* * * * *